US006568777B1

(12) United States Patent
Anderson et al.

(10) Patent No.: US 6,568,777 B1
(45) Date of Patent: May 27, 2003

(54) OPTICAL NAVIGATION SYSTEM AND METHOD

(75) Inventors: Mark A Anderson, Ft Collins, CO (US); Brian J. Misek, Ft. Collins, CO (US)

(73) Assignees: Agilent Technologies, Inc., Palo Alto, CA (US); Hewlett Packard, Inc., Palo Alto, CA (US)

( * ) Notice: Subject to any disclaimer, the term of this patent is extended or adjusted under 35 U.S.C. 154(b) by 0 days.

(21) Appl. No.: 09/440,924

(22) Filed: Nov. 16, 1999

(51) Int. Cl.[7] .............................. B41J 29/38; B41J 23/00
(52) U.S. Cl. ............................................. 347/9; 347/37
(58) Field of Search ........................... 347/37, 224, 225, 347/9, 12, 14; 358/1.5; 250/237 G; 33/707; 356/617; 400/280

(56) References Cited

U.S. PATENT DOCUMENTS

| | | | |
|---|---|---|---|
| 4,195,938 A | | 4/1980 | Velazquez |
| 4,572,952 A | * | 2/1986 | March ..................... 250/237 G |
| 4,734,868 A | | 3/1988 | DeLacy |
| 4,791,435 A | * | 12/1988 | Smith et al. ................... 347/17 |
| 5,116,150 A | | 5/1992 | Courtney ..................... 400/320 |
| 5,117,105 A | * | 5/1992 | Nagase et al. .......... 250/231.18 |
| 5,434,956 A | * | 7/1995 | Son et al. ..................... 358/1.5 |
| 5,563,591 A | | 10/1996 | Jacobs et al. |
| 5,650,820 A | * | 7/1997 | Sekine et al. ................ 347/263 |
| 6,056,454 A | * | 5/2000 | Plumley et al. ........... 347/37 X |
| 6,222,174 B1 | * | 4/2001 | Tullis et al. .............. 250/208.1 |

FOREIGN PATENT DOCUMENTS

| | | | |
|---|---|---|---|
| EP | 0 107 501 A2 | 10/1983 | ............... B41J/3/12 |
| EP | 0372844 A2 | 6/1990 | |
| EP | 0650844 A2 | 5/1995 | |
| EP | 0650844 A3 | 5/1995 | |
| EP | 1043168 A3 | 10/2000 | |
| EP | 1043168 A2 | 10/2000 | |
| GB | 2323459 | 9/1998 | |
| JP | 3000275 | 1/1991 | |

* cited by examiner

Primary Examiner—Thinh Nguyen (57) ABSTRACT

A printing device includes a navigation unit for monitoring a cooperative navigation surface and provides data to a navigation engine for processing and generation of a positional signal representative of the position of a moving printer head.

18 Claims, 6 Drawing Sheets

OPTICAL NAVIGATION SYSTEM AND METHOD

TECHNICAL FIELD

The present invention relates to an optical navigation system for use in applications requiring accurate positioning of a toolpiece in relation to a workpiece. More particularly, the present invention relates to an optical navigation system for positioning a toolpiece in accordance with a known navigation surface.

BACKGROUND OF THE INVENTION

In devices which perform operations on a workpiece, it is often necessary to accurately position a toolpiece in relation to the workpiece in order to carryout the desired operations so as to achieve desired results. In operations wherein repeatability is important, the need to accurately control the position of the toolpiece throughout each successive interaction of the operation in relation to the workpiece is very important.

Figure 1:
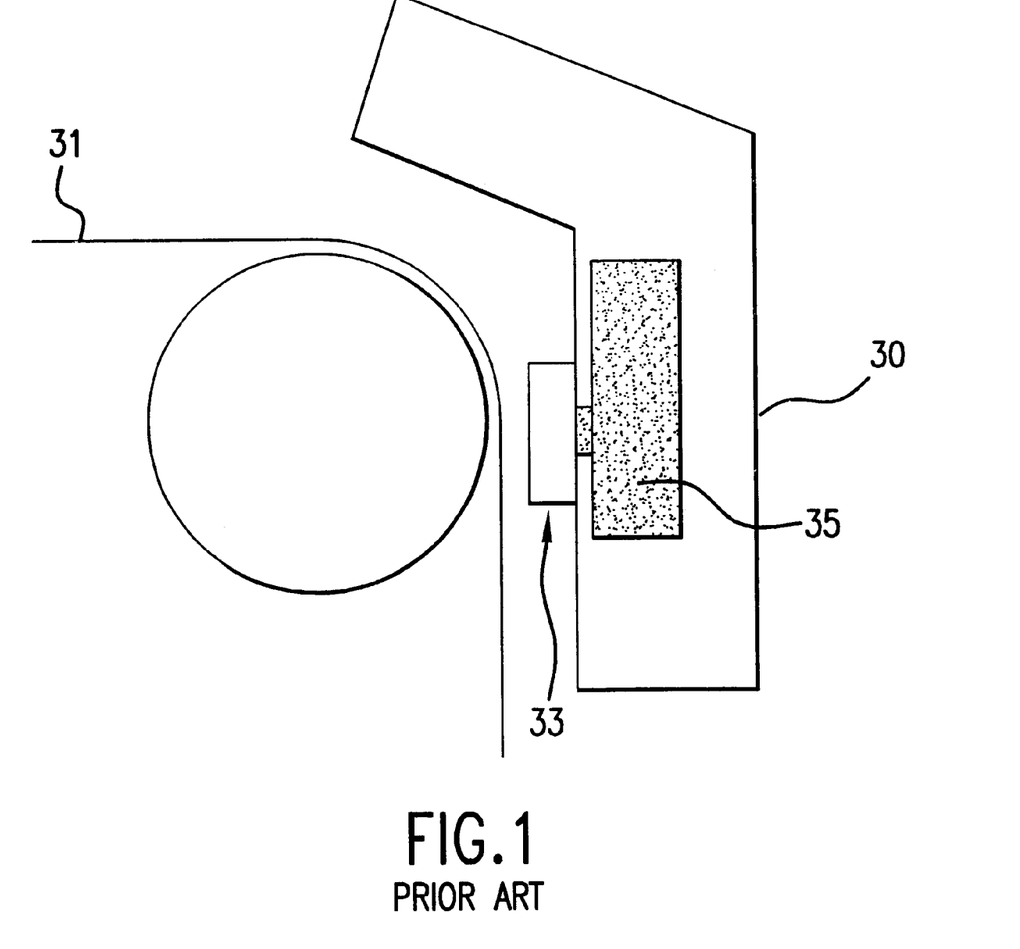
FIG. 1 is an illustration describing the prior art.

One example of a device that performs operations on a workpiece is a typical printing device, for example, but not limited to, a laser, ink jet, or dye-sublimation printer or the like is shown in FIG. 1. FIG. 1 shows a printer cartridge 30, a storage reservoir 35, a print head 33, and a print media 31. These printers perform printing operations by distributing a dye, or pigment, onto a print media such as paper or resin coated substrate.

During the printing process carried out by a typical printing device it is common to move the print head about the surface of a print media in order to deliver pigment, or dyes, to the print media at predetermined locations thereon. In order to achieve desired and repeatably consistent results, it is necessary for the positioning of the printer head to be accurately controlled.

Known methods of controlling the positioning of the printer head include the use of rotary shaft encoders that monitor the rotation of shafts which feed the print media through the printing device during the printing process, glass etched optical encoders, as well as stepper motors. Unfortunately rotary encoders suffer from mechanical backlash which precludes consist and accurate control of print head navigation. Glass etched encoders are very expensive and not useful in cost sensitive applications where high resolution printing is desired. Finally, stepper motors suffer from inaccuracies due to loss of step count. Additionally, stepper motors are relatively expensive.

Optical navigation systems have been employed to determine the position of a toolpiece in relation to a work piece, however, because these systems have relied upon a the surface or feature of the print media itself, there were inconsistencies in results. Thus, a heretofore unaddressed need exists in the industry to address the aforementioned deficiencies and inadequacies.

SUMMARY OF THE INVENTION

The present invention provides for a cooperative navigation surface, a navigation unit for optically monitoring the navigation surface, and a navigation engine for generating an output signal representative of the position of a toolpiece. The present invention provides for navigation of a print head for printing onto a print media based upon optical feedback derived from a known cooperative navigation surface, while printing onto a separate independent surface, or print media.

Further, the present invention seeks to provide a navigation unit which tracks movement of the print head in the X direction and movement of the print media in the Y direction. By providing for optical navigation of a known navigation surface, the present invention seeks to avoid errors and inaccuracies that are common with typical optical navigation systems.

The present invention can also be viewed as providing a method for printing on a print media. In this regard, the method can be broadly summarized by the following steps: optically monitoring a cooperative navigation surface and generating an image output signal in accordance therewith; and delivering a pigment to a print media in accordance with said image output signal.

DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 2:
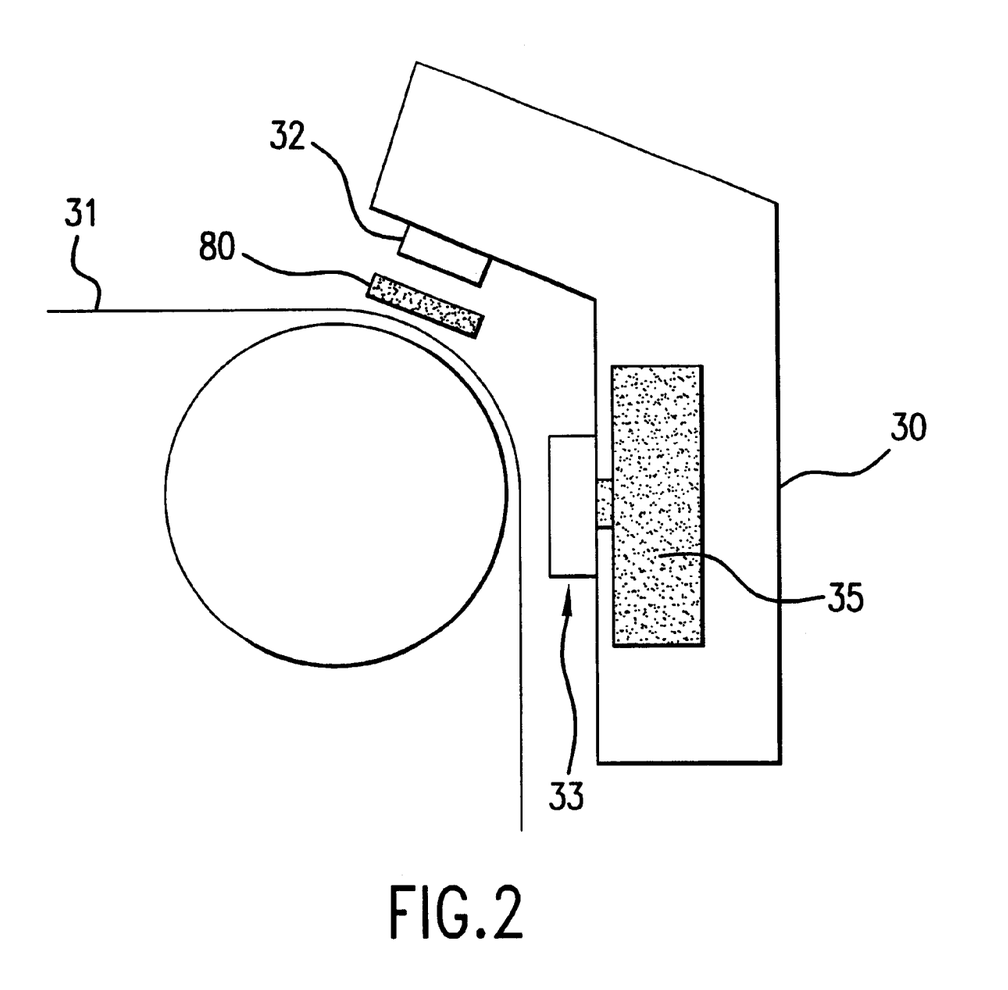
FIG. 2 is an illustration describing one embodiment of the present invention.
Figure 3:
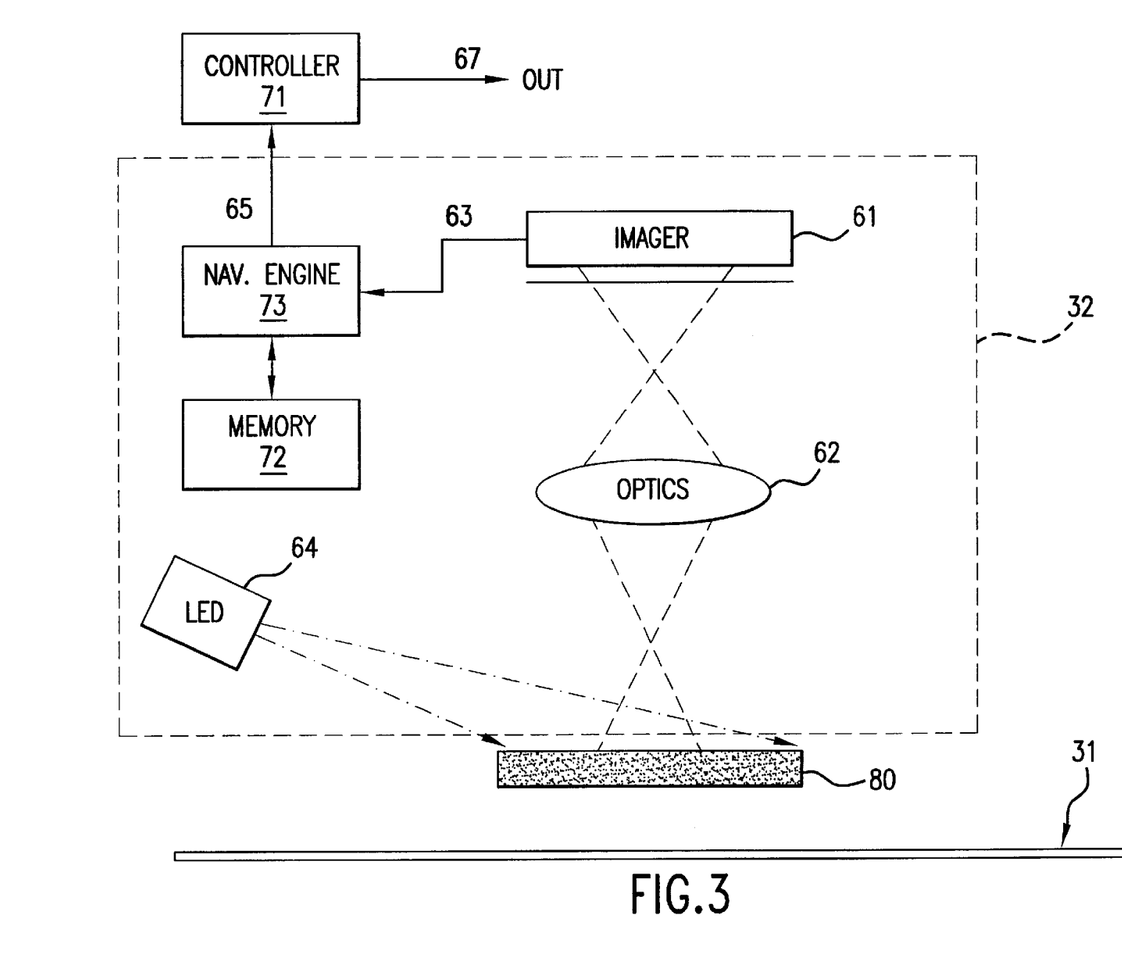
FIG. 3 is a diagram illustrating a navigation unit.
Figure 6:
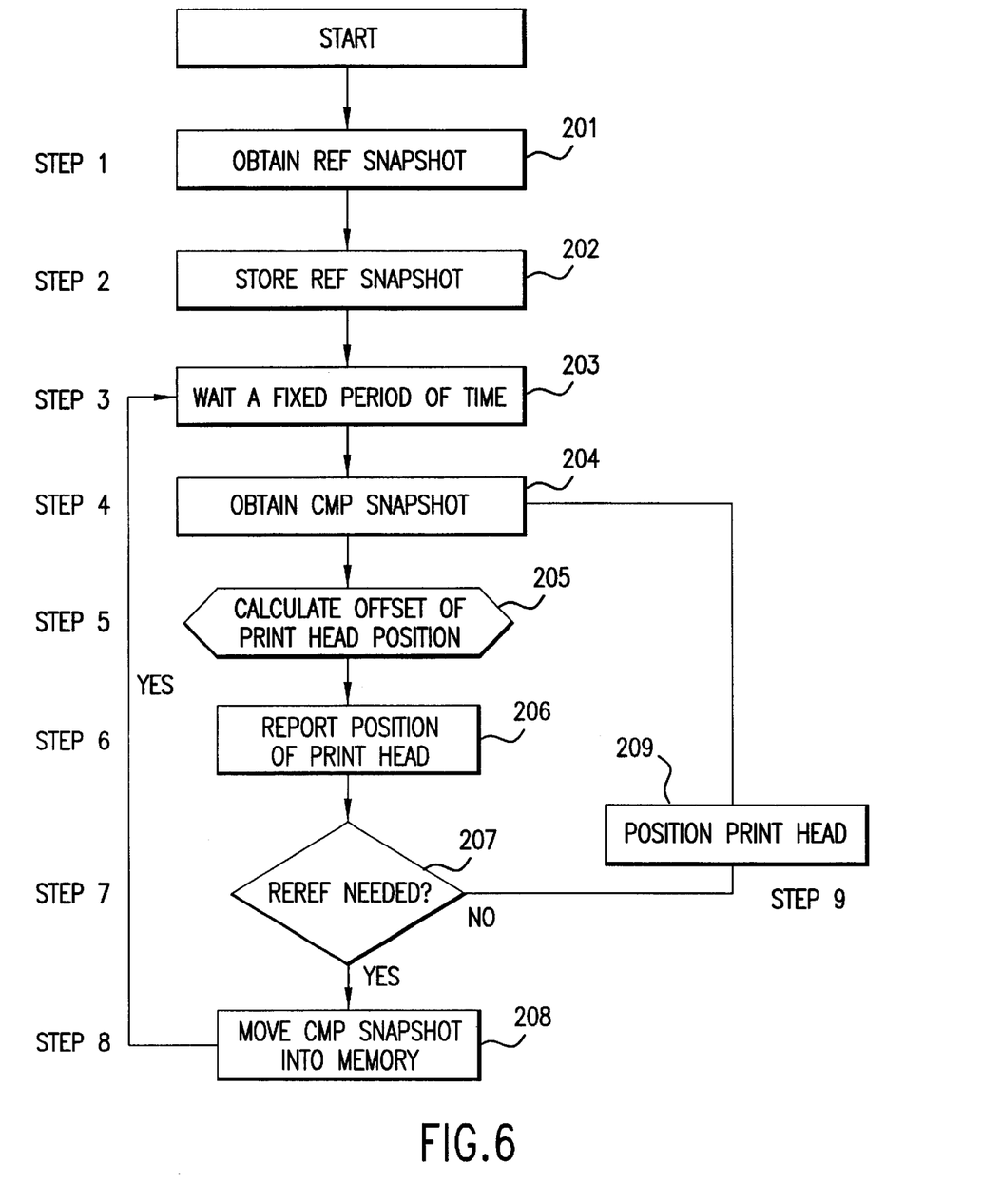
FIG. 6 is a flow chart describing the method of the present invention.

With reference to FIG. 2 there is shown a printer cartridge 30, which is arranged adjacent to a paper path (or work path) which receives a print media 31. Printer cartridge 30 incorporates a printer head 33 and a navigation unit 32. With reference to FIG. 3, navigation unit 32 can be seen to include an imager 61 and an optical system 62 for focusing light reflected from print media 31 on to imager 61. Illumination of the print media 31 is provided by light source 64. Imager 61 is preferably a complementary metallic-oxide semiconductor (CMOS) photo imager, however, other imaging devices such as a charge coupled-device (CCD), photo diode array or photo transistor array may also be used. Light from light source 64 is reflected from print media 31 and on to imager 61 via optical system 62. Light source 64 as shown on FIG. 6 is a light emitting diode (LED). However, other light sources can also be utilized including, for example, incandescent or fluorescent light sources. Additionally, it is possible for ambient light sources external to navigation unit 32 to be utilized provided such light level is sufficient to meet the sensitivity threshold requirements of the Imager 61. Imager 61 generates a signal 63, or snapshot, at a predetermined rate, representative of that portion of the navigation surface 80 that is currently being monitored, or imaged by imager 61. This output signal 63 is delivered to a navigation engine 73 and may be stored into memory 72. The navigation engine converts raw image data into positional information that is delivered to the controller 71. Navigation engine 73 generates positional signal 66 and outputs it to controller 71. Controller 71 subsequently generates an output signal 65 that can be used to position the print head 33. It should be noted that navigation engine 73, and memory 72, could be configured as an integral part of navigation unit 32. Further navigation engine 73 could be implemented as, for example, but not limited, a dedicated digital signal processor (DSP); an application specific integrated circuit (ASIC) or a combination of logic gates.

FIG. 6 is a flow chart illustrating the method of the present invention. The print head 33 is positioned. A reference snap shot (REF) of navigation surface 80 is obtained via navigation unit 32 (201). The reference snap shot (REF) is stored into memory 72 (202). After a fixed period of time has elapsed (203), a comparison snap shot (CMP) of navigation surface 80 is obtained via navigation unit 32 (204). Navigation engine 73 calculates the position of print head 33 via cross correlating reference snap shot (REF) with comparison snapshot (CMP) (205). The position of print head 33 is then reported to the controller 71 in accordance with the calculations of 205 (206). A determination is made as to whether or not the print head 33 has moved more than a predetermined distance (or to a point where CMP and REF snapshots share less than a predetermined area of commonality) since the reference snapshot (REF) was obtained (207). If it is determined in 207 that the print head 33 has moved more than a predetermined distance ("out of bounds"), the comparison snapshot (CMP) obtained in 206 is stored to memory 72 and becomes the new REF snapshot (208). Print head 33 can then be re-positioned in accordance with the position reported to controller 71 at 206 (209).

Navigation surface 80 preferably has a cooperative texture, or pattern, along all surface areas that will be monitored by imager 61 of navigation unit 32. It should be noted, however, that the surface texture of navigation surface 80 could also be of a random nature.

Figure 5:
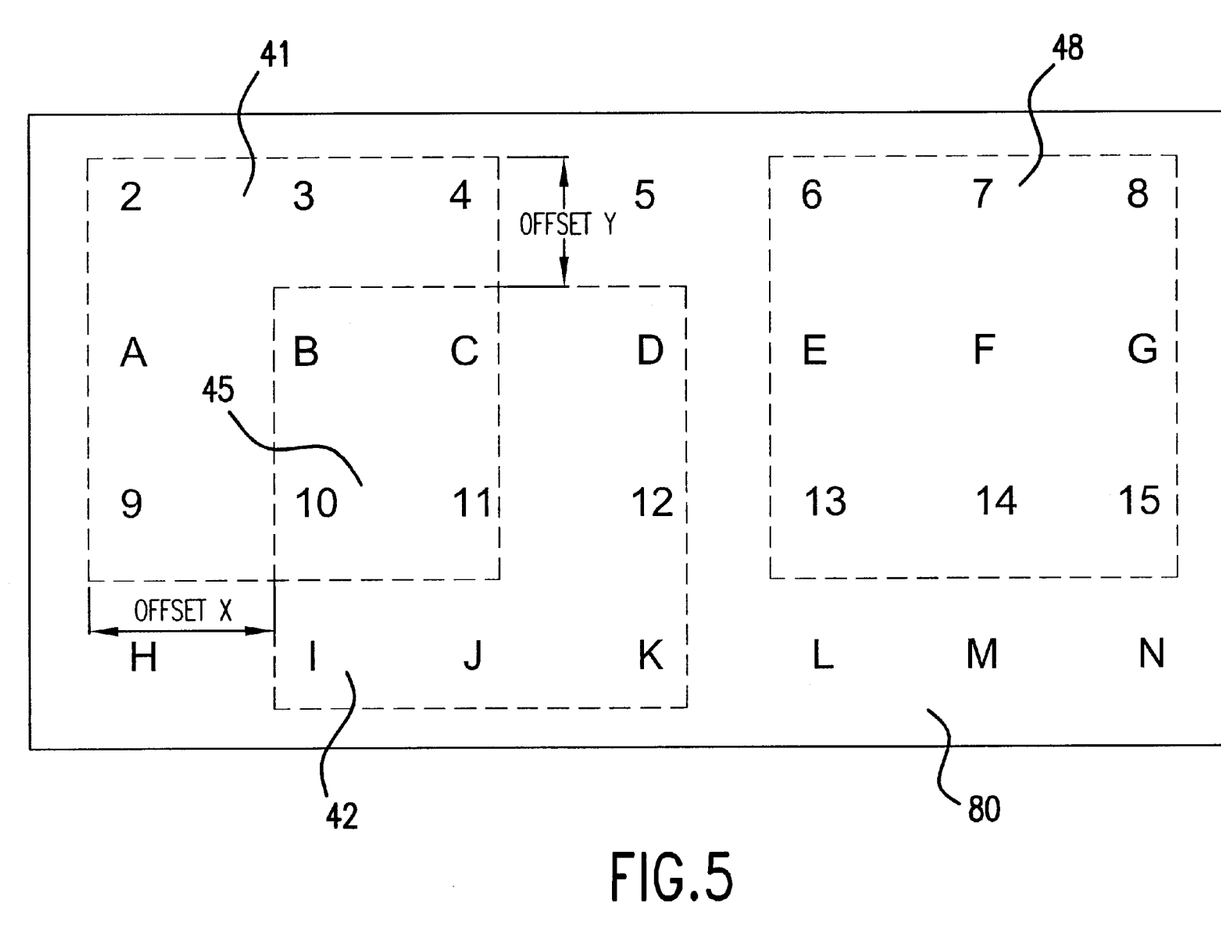
FIG. 5 is an illustration describing cross-correlation between reference and comparison snapshots captured by a navigation unit.

FIG. 5 shows a navigation surface 80, which has a distinct surface characteristic, or pattern. In this example, the pattern is represented by alpha-numeric characters to ease explanation, as the alpha-numeric characters are more easily distinguishable for purposes of discussion. However, such alpha-numeric characters could in fact be used as an effective navigation surface pattern as contemplated by the present invention.

Figure 4:
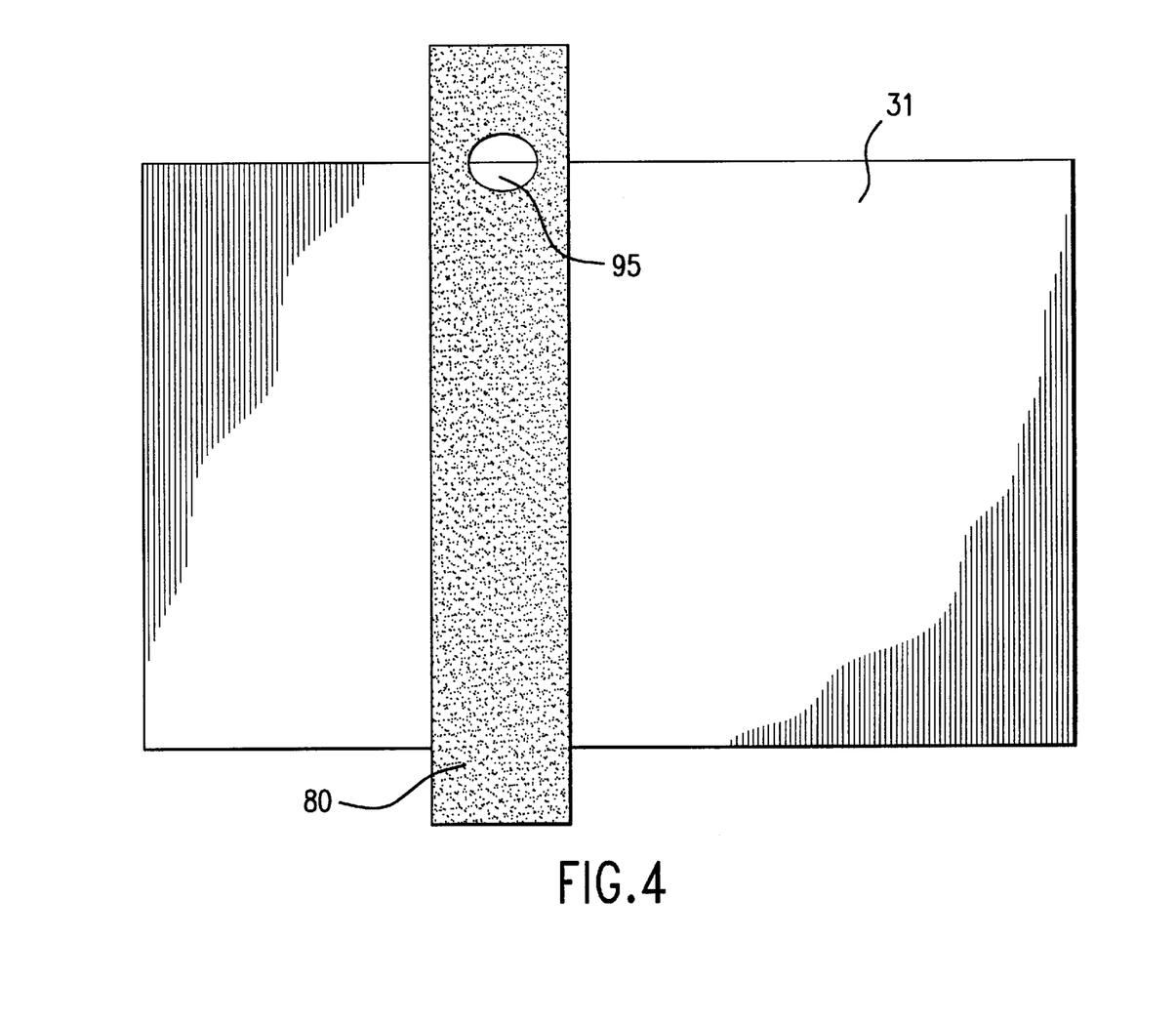
FIG. 4 is an illustration describing a navigation surface in relation to a print media.

With reference to FIG. 4, it can be seen that one embodiment of the present invention requires that observation window 95, be formed in navigation surface 80 so that navigation unit 32, and more specifically imager 61, can visually monitor the position of print media 31. As the print media 31 is in a different plane than the navigation surface 80, it may be desirable to provide for an optics systems, or lens, in the observation window 95 to compensate for this difference and allow imager 61 to accurately image the print media 31 and the navigation surface 80.

With reference to FIG. 5, there is shown a first, or reference (REF) snapshot (REF) 41; a second, or comparison (CMP) snapshot (CMP) 42; and an area of commonality 45. Each snapshot, REF 41 and CMP 42, represents a predetermined area, for example, an area 1 mm$^2$.

During the printing process, navigation unit 32 obtains a first snap shot (image) of the navigation surface 80 as a reference snapshot (REF). This reference-snapshot data (REF) is stored into memory 72. After a fixed amount of time, a second snapshot of the navigation surface 80 is obtained by the navigation unit 32 as comparison (CMP) snapshot 42. Data representing CMP 42 is then compared by navigation engine 73 with data representing REF 41, which is stored in memory 72 to determine the present position of print head 33. More particularly, CMP data is mathematically cross-correlated with REF image data stored in memory 72 so as to determine the offset, in both the X and Y direction, between the first (REF) snapshot 41 and the second (CMP) snapshot 42. Cross correlation calculations may be carried out as follows:

$$C_{i,j} = \sum_{m=1}^{M} \sum_{n=1}^{N} 1 r_{m,n} - c_{m-i,n-j} 1$$

where $r_{m,n}$ and $c_{m,n}$ represent REF and CMP snapshots at point {m,n} and i and j represent the offset between REF and CMP snapshots.

The area of the navigation surface 80 that is the subject of each snapshot is typically substantially less than the overall size (area) of the navigation surface 80. As the print head 33 moves, so does the navigation unit 32 in relation to the navigation surface 80. In order for cross-correlation calculations to be effectively carried out, it is important that details of the navigation surface 80 contained in the REF snapshot have some commonality (area of commonality 45) with details of the navigation surface 80 contained in the second CMP snapshot. In other words, the distance traveled by navigation unit 32 between the point at which the REF snapshot is obtained and the point at which the CMP snapshot is obtained cannot be so great that the details contained in the CMP snapshot totally lack commonality with the REF snapshot. If this condition occurs, the print head 33 will become "lost" or "out of bounds." In order for navigation to function smoothly it is necessary for the CMP snapshot of the navigation surface to be taken so as to include at least some portion of the navigation surface details that also appear in the first REF snapshot image.

As movement of the print head/navigation unit progresses, the overlap (or area of commonality) between the CMP and REF snapshots decreases. In the extreme case, there would be no overlap (area of commonality) between the CMP and REF images, as is exemplified in FIG. 5 by REF snapshot 41 and snapshot 48. In this case, the navigation unit 32 would become "lost" and be unable to properly report the position the print head 33. However, in the present invention as the area of commonality between the CMP snapshot and the REF snapshot decreases to a predetermined area, or percentage, of commonality (overlap), the CMP snapshot is copied into storage memory 72 to thus become the new REF snapshot. This procedure is called a re-referencing procedure or REREF. Immediately, subsequent to a REREF, the CMP snapshot and REF snapshot are the same, meaning that there is complete or total overlap (commonality) for cross-correlation purposes.

An alternate to the above procedure involves obtaining a cumulative snapshot of the entire navigation surface 80 via taking a series of snapshots of the navigation surface at various points along the navigation surface and storing the data into memory 72. This stored data cumulatively represents the entire navigation surface (cumulative snapshot), or a selected portion thereof. Subsequently, as print head 33 is positioned, and repositioned during the printing process, comparison snapshots (CMP) are taken of the navigation surface and compared with the cumulative snapshot data stored in memory 72. This alternative does require increased hardware, specifically memory. To accommodate the increased snapshot data size. However, it eliminates the possibility that cross-correlation calculations cannot be carried out where the CMP snapshot shares no commonality of details with the REF snapshot (where the print head 33 gets lost), since all details of the navigation surface 80 are stored in memory 72.

The present invention is described herein via the example of a printing device. It will be recognized by persons skilled in the art that the present invention is equally applicable to scanning devices such as a photographic or flat-bed paper scanners. Further the present invention can be implemented in automated factory or manufacturing equipment and the like wherein assembly operations are carried out. Additionally, the present invention is also applicable to medical applications, such as diagnostic imaging, or control of surgical instrumentation.

The foregoing description has been presented for purposes of illustration and description. It is not intended to be exhaustive or to limit the invention to the precise forms disclosed herein. Obvious modifications or variations are possible in light of the above teachings. The embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed:

1. A printing device comprising:
    a print head for printing on a print media; and
    a navigation unit configured to optically monitor a random cooperative navigation surface and at a predetermined time to generate first image data representative of an image of a first portion of said random cooperative navigation surface and store said first image data into memory;
    said navigation unit is further configured to generate second image data representative of a second image of a second portion of said random cooperative navigation surface that includes at least a portion of said first portion of said random cooperative navigation surface;
    said navigation unit comprises a navigation engine configured to compare said first image data and said second image data to determine an offset between said first image data and said second image data;
    said navigation unit and said print head are configured to move in unison; and
    controller for positioning said print head in accordance with said offset determined by said navigation unit.

2. A printing device according to claim 1 wherein said first image data representative of an image of a first portion of said random cooperative navigation surface comprises data representing an image of the entire random cooperative navigation surface.

3. A printing device according to claim 2 further comprising said memory for storing said first image data.

4. A printing device according to claim 1 further comprising said random cooperative navigation surface.

5. A printing device according to claim 1 further comprising a storage reservoir for storing pigment.

6. A printing device according to claim 1 further comprising a print media path for receiving said print media.

7. A printing device according to claim 1 wherein said cooperative navigation surface comprises an observation window through which said navigation unit optically monitors the position of said print media.

8. A method of positioning a print head in relation to a print media comprising the steps of:
    receiving a print media within a print media path having predetermined X and Y dimensions;
    optically monitoring a random navigation surface and generating reference data representative of a first portion of said random cooperative navigation surface;
    storing said reference data to memory;
    generating at a second predetermined time, comparison image data representative of a second portion of said random navigation surface that includes at least a portion of said first portion of said random navigation surface; and
    comparing said reference data and said comparison data to determine an offset in the X and Y directions, said offset being representative of the change in position of a print head in the X and Y directions between said first predetermined time and said second predetermined time.

9. A method of printing onto a print media according to claim 8 further comprising the step of positioning said print head in relation to said print media in accordance with said determined offset.

10. A processing device comprising:
    a workpath for receiving a workpiece;
    a toolpiece for performing a predetermined operation on said workpiece;
    a random navigation surface;
    a navigation unit configured to optically monitor said random navigation surface and generate first image data representative of a portion of said random navigation surface and to generate second image data representative of a second portion of said random navigation surface, said first image data corresponding to a position of said toolpiece at a first time and said second image data corresponding to a position of said toolpiece at a second time;
    a storage memory for storing said first image data;
    said navigation unit comprises a navigation engine configured to compare said first image data and said second image data to determine an offset between said first image data and said second image data; and
    a controller for controlling the position of said toolpiece in accordance with said offset determined by said navigation unit.

11. A processing device, according to claim 10, wherein said toolpiece comprises a print head for delivering a pigment to a print media.

12. A processing device, according to claim 11, wherein said workpiece comprises a print media.

13. A processing device, according to claim 12, wherein said workpath comprises a paper path for receiving a print media.

14. A printing device comprising:
    printing means for delivering a pigment to a print media;
    a random cooperative navigation surface;
    memory for storing reference data;
    imaging means for optically monitoring said random cooperative navigation surface and generating comparison image data representative of a portion of said random cooperative navigation surface; and means for comparing said reference data and said comparison data to determine an offset in the X and Y directions, said offset being representative of the change in position of said printing means in the X and Y directions during a predetermined time period.

15. A printing device according to claim 14 further comprising controller means for controlling the position of said printing means in accordance with said offset determined by said means for comparing.

16. A printing device according to claim 14 wherein said printing means comprises a printer head.

17. A printing device according to claim 14 wherein said imaging means comprises a CMOS photo imager.

18. A printing device comprising:

a print head for printing on a print media; and a navigation unit configured to optically monitor a random cooperative navigation surface and at a predetermined time to generate first image data representative of an image of a first portion of said random cooperative navigation surface and store said first image data into memory;

said navigation unit is further configured to generate second image data representative of a second image of a second portion of said random cooperative navigation surface that includes at least a portion of said first portion of said random cooperative navigation surface;

said navigation unit comprises a navigation engine configured to compare said first image data and said second image data to determine an offset between said first image data and said second image data;

said navigation unit and said print head are configured to move in unison; controller for positioning said print head in accordance with said offset determined by said navigation unit; and said cooperative navigation surface comprises an observation window through which said navigation unit optically monitors the position of said print media.

* * * * *